(12) United States Patent
Horsch

(10) Patent No.: US 7,850,474 B2
(45) Date of Patent: Dec. 14, 2010

(54) SEAL FOR A TRANSMISSION WITH A MECHATRONIC SYSTEM

(75) Inventor: Nicolai Horsch, Maildorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 449 days.

(21) Appl. No.: 11/916,853

(22) PCT Filed: Jun. 2, 2006

(86) PCT No.: PCT/EP2006/005258

§ 371 (c)(1),
(2), (4) Date: Dec. 7, 2007

(87) PCT Pub. No.: WO2006/133817

PCT Pub. Date: Dec. 21, 2006

(65) Prior Publication Data

US 2008/0207032 A1    Aug. 28, 2008

(30) Foreign Application Priority Data

Jun. 16, 2005   (DE) .................. 10 2005 027 832

(51) Int. Cl.
*H01R 13/52* (2006.01)
(52) U.S. Cl. .................... 439/271; 303/119.2
(58) Field of Classification Search .......... 303/119.2, 303/119.3, 113.1; 439/271, 140, 248; 277/590; 74/606 R
See application file for complete search history.

(56) References Cited

U.S. PATENT DOCUMENTS

| 3,232,786 | A | | 2/1966 | Kellman |
|---|---|---|---|---|
| 4,083,902 | A | | 4/1978 | Clyde |
| 5,275,478 | A | | 1/1994 | Schmitt et al. |
| 5,520,447 | A | * | 5/1996 | Burgdorf et al. .......... 303/119.3 |
| 5,722,741 | A | * | 3/1998 | Steffes ..................... 303/119.2 |
| 6,193,564 | B1 | | 2/2001 | Loibl et al. |

FOREIGN PATENT DOCUMENTS

| DE | 196 39 198 A1 | 3/1997 |
|---|---|---|
| DE | 196 19 968 A1 | 11/1997 |
| DE | 297 14 229 U1 | 1/1998 |
| DE | 198 17 198 A1 | 10/1999 |
| DE | 298 13 307 U1 | 1/2000 |
| DE | 203 07 084 U1 | 8/2003 |
| EP | 0 673 805 A1 | 9/1995 |
| GB | 2 249 874 A | 5/1992 |
| WO | WO-91/10583 | 7/1991 |

* cited by examiner

*Primary Examiner*—Edwin A. Leon
(74) *Attorney, Agent, or Firm*—Davis & Bujold, P.L.L.C.

(57) ABSTRACT

A seal for an automatic transmission (12) having mechatronics with an electronic module (14) and an electro-hydraulic control unit. The electronic module (14), when installed, is electrically connected, via terminal connectors (20), with at least one actuator (16) and/or sensor of the electro-hydraulic control unit. The seal is inserted between the electronic module (14) and at least one actuator and/or sensor and consists of an elastically moldable soft material element (10).

14 Claims, 1 Drawing Sheet

SEAL FOR A TRANSMISSION WITH A MECHATRONIC SYSTEM

This application is a national stage completion of PCT/EP2006/005258 filed Jun. 2, 2006, which claims priority from German Application Serial No. 10 2005 027 832.9 filed Jun. 16, 2005.

FIELD OF THE INVENTION

The invention pertains to a seal for a transmission with mechatronics and a related method.

BACKGROUND OF THE INVENTION

Continually increasing demands on motor vehicles with respect to emissions, fuel consumption, safety and comfort require more and more complex systems that generally consist of a combination of mechanical and electronic components. In the past, if such systems were mostly developed separately by electronic and mechanical system, nowadays there is an ever stronger focus on the so-called mechatronics approach, where combined development of mechanical and electronic components provides for an optimal targeted solution.

By use of mechatronics, which conceptually also comprises networked mechanical and electronic control units, different support systems can be interlinked to improve safety. One example here is the combination of ABS control units and ESP control units with the electronic motor control or the control of an automatic transmission. First-generation mechatronic systems only optimize the control of certain machine behavior, but humans and their characteristics and requirements can just as readily be included in a control loop. This characterizes the mechatronic systems of the second generation. Here there is a direct interaction between human, sensor and actuator.

It is known that all shift procedures can be precisely adjusted within the transmission by way of mechatronics. For the operator of a vehicle with an automatic transmission, this translates into high shifting speed, optimized shifting quality and increased driving comfort. The shifting electronics not only send signals, but also receive data related to the individual driving situation. This allows the electronic control to recognize the transmission gear ratio condition, the driving resistance (for example, vehicle weight and road incline) as well as the driving characteristics of the driver and to react accordingly, for instance with optimized shifting times. By doing so, it covers a large variety of driving styles, ranging from very sporty to very economical.

Electrical short circuits within the area of the actuator system have been known as a source of malfunction of automatic transmissions with mechatronics directly integrated on or in the transmission housing. These short circuits are caused by metal shavings introduced into the area of the conventionally open electrical actuator contacts through the oil stream of the transmission. Metal shavings come from component processing, wear and tear or particles and will never be completely eliminated.

The actuators usually have relatively large funnel-shaped openings in the area of the electrical contact in order to ensure secure and fast installation and/or connection of control lines. So-called blade contacts are often used at the ends of control lines to establish the electrical contact of the actuators, which have a high degree of flexibility in order to balance the chain of tolerances between the hydraulic actuators and the electronic module.

In this context, it is the purpose of the invention to effectively and economically prevent the entry of metal shavings into the area where the actuators and/or sensors make electrical contact.

SUMMARY OF THE INVENTION

The invention is based on the knowledge that the introduction of metal shavings in the area where the actuators and/or sensors are contacted can be prevented when the electronic module and the actuators and/or sensors are sealed off from one another.

The invention is based on a seal for an automatic transmission with mechatronics, with an electronic module and an electro-hydraulic control unit, where the electronic module is installed electrically connected, via terminal connectors, with at least one actuator and/or sensor of the electro-hydraulic control unit, where the seal is inserted between the electronic module and the at least one actuator and/or sensor and consists of an elastically moldable element made of soft material.

The seal, according to the invention, results in an excellent seal between the electronic module and the at least one actuator and/or sensor. Selection of the seal thickness, the seal profile and the material hardness makes it possible to adjust sealing performance exactly to the surfaces of the opposing sealing surfaces.

In a preferred embodiment, the soft material element is designed to shield an electrical contact point between an electronic module and an actuator and/or sensor against contamination, particularly by metal shavings.

Electrical short circuits in the area of the actuator system, caused by metal shavings which are flushed by the transmission oil stream into the area of the open electric actuator contacts, are thus prevented.

In a preferred embodiment, the soft material element is formed to provide a full-surface seal of the electrical contact point and/or the contact area between the contacts of the electronic module and the actuator and/or sensor.

As mentioned, actuators of this type normally have relatively large funnel-shaped openings in the electrical contact area in order to ensure secure installation. The full-surface seal of the electrical contacts between contact points of the electronic module and the actuator and/or sensor effectively and economically prevent metal shavings from entering these openings.

In a preferred embodiment, the soft material element is designed as a sealing strip to individually enclose the electrical contact points. In this case, the soft material element can be designed with ribs, which has the advantage that the soft material element elastically compensates for variations of the sealing gap caused by forces from shifting elements, and always ensures reliable sealing and/or enclosing of the electrical contacts with respect to one another. The ribs feature a variable geometry and/or rigidity. This generally ensures a sufficient seal compression for all operating conditions.

In a preferred embodiment, the soft material element is designed to be made out of open- or closed-cell material. This also aids in achieving high position precision of the functional areas in addition to fast installation.

In another preferred embodiment, the soft material element is made out of soft polyurethane foam. Polyurethane is a versatile plastic with high innovation potential, because it offers an interesting combination of characteristics with regard to elasticity, resiliency and resistance to aging in a broad temperature range. It is flexible and resilient and/or wear resistant against aggressive materials and chemicals.

This increases the life span of products made out of polyurethane. Polyurethane is also flame-retardant.

The advantages of polyurethane, in comparison with metal, as a seal are found particularly in its greater flexibility and the significantly lower weight. Studies have shown that a soft material element made out of polyurethane is proven to be a simple yet safe as well as reliable safety device to achieve the purpose of the invention.

In a preferred embodiment, the soft material element is formed as a molded seal. Here a seal is created between the electronic module and the actuator and/or sensor, which ensures a sealed connection point in any operating conditions and permits simple installation.

In another preferred embodiment, the soft material element is formed as a rib for full surface sealing and/or shielding of several actuators and/or sensors in the sense of an installation unit. The soft material element allows for simple installation since, due to the rib, it is now possible to achieve exact positioning without an additional centering tool.

According to another embodiment, the soft material element is designed as a plate for full surface sealing and/or shielding of electrical busbars and/or electric contact points.

The connecting point between the electronic module and the actuator and/or sensor normally features busbars and electrical contact points in the sealing surface, in addition to bore holes used to receive a screw connection. These are reliably sealed against one another and against the exterior to ensure trouble-free operation.

The task is also addressed by providing a method for sealing an automatic transmission with mechatronics with an electronic module and an electro-hydraulic switching unit, where the electronic module is electrically connected, via terminal connectors, with at least one actuator and/or sensor of the electro-hydraulic control unit and where the seal is inserted between the electronic module and the at least one actuator and/or sensor and consists of an elastically moldable soft material element.

This makes it possible to reliably eliminate electrical short circuits as a source of malfunctions, in automatic transmissions with mechatronics, in the area of the actuator.

Finally, in a preferred embodiment of the method, the soft material element is loosely fitted and/or placed on the electrical contacts and only penetrated by same during the course of the installation. Here the soft material element can be installed quickly and reliably.

BRIEF DESCRIPTION OF THE DRAWING

The invention will now be described, by way of example, with reference to the accompanying drawing in which.

DETAILED DESCRIPTION OF THE INVENTION

Figure 1:
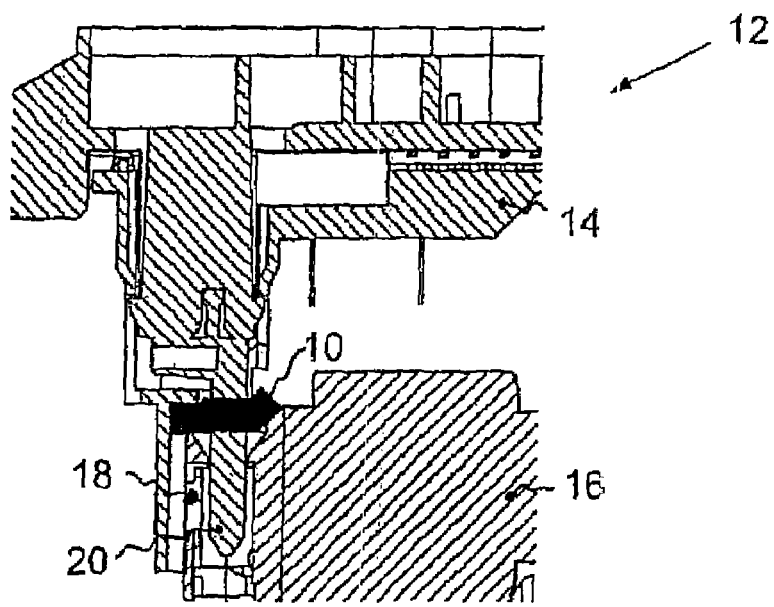
FIG. 1 is a schematic cross-section of a seal between an electronic module and an actuator of an automatic transmission.

FIG. 1 shows a seal as a soft material element 10 for an automatic transmission 12 with an electronic module 14 and an actuator 16. The actuator 16 has relatively large funnel-shaped openings in the area of an electrical contact point 18 in order to ensure a secure installation. In this embodiment, blade contacts 20 are used as electrical terminal connectors 20, which usually have a high degree of flexibility in order to balance the chain of tolerances between the hydraulics and the electronic module 14. In this embodiment, the seal is formed as a soft material element 10, which is elastically moldable.

The soft material element 10 has been proven to be suited to shield the electrical contact point 18 between the electronic module 14 and actuator 16 against contamination, particularly by metal shavings. The shavings can be flushed into the area of the conventionally open, funnel-shaped electrical contact points 18 of the actuator 16, in particular through the oil stream of the transmission. In this embodiment, the soft material element 10 is designed to provide a full-surface seal of the electrical contact point 18 between contacts of the electronic module 14 and the actuator 16.

The soft material element 10 is preferably made out of soft polyurethane foam, however, other equally effective materials can be used.

Figure 2:
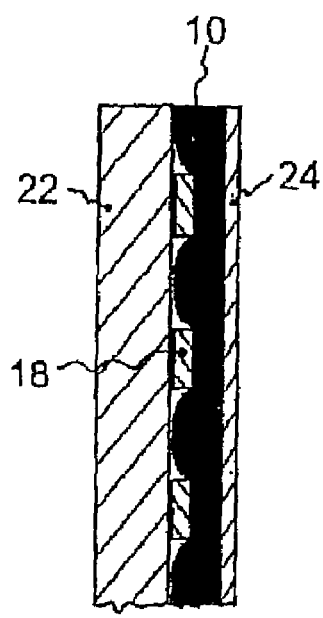
FIG. 2 is a schematic cross-section of a seal as a soft material element in an exemplary embodiment.

FIG. 2 shows a schematic cross-section of a seal as a soft material element 10 in an exemplary embodiment. The soft material element 10 is configured between a carrier plate 22 and a cover 24 between the electronic module 14 and the actuator 16 (not shown). The soft material element 10 is configured to be elastically moldable in this embodiment as well.

As illustrated in FIG. 2, the soft material element 10 is designed as a molded seal, where the soft material element 10 can additionally be designed as a rib to provide a full surface seal and/or shield. The soft material element 10 is designed as a full surface seal and/or shield of the electrical contact points 18, where the electrical contacts are individually enclosed. FIG. 2 shows the soft material element 10 in a closed cell version. In another embodiment, the soft material element 10 can be made from open cell material.

REFERENCE NUMERALS 10 soft material element
12 automatic transmission
14 electronic module
16 actuator
18 electrical contact point
20 terminal connector
22 carrier plate
24 cover

The invention claimed is:

1. A sealing strip for mechatronics of an automatic transmission (12) with an electronic module (14) and an electro-hydraulic control unit, the electronic module (14) being installed electrically connected, via terminal connectors (20), with at least one of an actuator (16) and a sensor of the electrohydraulic control unit, the sealing strip being inserted between the electronic module (14) and the at least one actuator (16) and sensor and comprising an elastically moldable soft material element (10), the soft material element (10) shielding a plurality of electrical contact points (18) between the electronic module (14) and the at least one actuator (16) and sensor against contamination, particularly by metal shavings, as a sealing strip, which is fitted onto the terminal connectors (20) of the plurality of electrical contact points (18) and, during installation, only penetrated by the terminal connectors (20), the sealing strip being configured as the soft material element (10) and, in an installed condition, provides a full contact seal for the plurality of electrical contact points (18) between contacts of the electronic module (14) and the at least one actuator (16) and sensor and individually encloses the plurality of electrical contact points (18).

2. The sealing strip according to claim 1, wherein the sealing strip shields at least three electrical contact points (18).

3. The sealing strip according to claim 1, wherein the soft material element (10) is made from one of an open-cell material and a closed-cell material.

4. The sealing strip according to claim 3, wherein the sealing strip shields at least three electrical contact points (18).

5. The sealing strip according to claim 1, wherein the soft material element (10) is made out of polyurethane foam.

6. The sealing strip according to claim 5, wherein the sealing strip shields at least three electrical contact points (18).

7. The sealing strip according to claim 1, wherein the soft material element (10) is a molded seal.

8. The sealing strip according to claim 7, wherein the sealing strip shields at least three electrical contact points (18).

9. The sealing strip according to claim 1, wherein the soft material element (10) is a rib for one of a full surface sealing and a shielding of several of the at least one actuator (16) and sensor in the sense of an installation unit.

10. The sealing strip according to claim 9, wherein the sealing strip shields at least three electrical contact points (18).

11. The sealing strip according to claim 1, wherein the soft material element (10) is a plate to provide one of full surface sealing and shielding of at least one of electrical busbars and the electrical contact points (18).

12. The sealing strip according to claim 11, wherein the sealing strip shields at least three electrical contact points (18).

13. Mechatronics with a sealing strip for an automatic transmission (12), the mechatronics comprising:
   an electronic module (14) having at least one terminal connector (20);
   an electrohydraulic control unit having an actuator (16);
   a sealing strip (10) made of an elastically moldable soft material element, the sealing strip (10) being a full contact seal located between the electronic module (14) and the electrohydraulic control unit;
   the at least one terminal connector (20) piercing the sealing strip (10) such that the at least one terminal connector (20) communicates with actuator (16) at a plurality of electrical contact points (18) to form an electrical connection between the electronic module (14) and the electrohydraulic control unit;
   the plurality of electrical contact points (18) being sealed, from contamination, in a respective enclosure formed from the sealing strip (10); and
   the sealing strip (10) is located between a carrier plate of the electronic module (14) and a cover (24) of the actuator (16).

14. The sealing strip according to claim 13, wherein the sealing strip shields at least three electrical contact points (18).

* * * * *